(12) United States Patent
Wang et al.

(10) Patent No.: US 10,520,747 B2
(45) Date of Patent: Dec. 31, 2019

(54) LENS MODULE

(71) Applicant: LUXVISIONS INNOVATION LIMITED, New Territories OT (HK)

(72) Inventors: Yu-Pin Wang, Taipei (TW); Shih-Chieh Yen, Taipei (TW)

(73) Assignee: LUXVISIONS INNOVATION LIMITED, New Territories (HK)

( * ) Notice: Subject to any disclaimer, the term of this patent is extended or adjusted under 35 U.S.C. 154(b) by 183 days.

(21) Appl. No.: 15/913,939

(22) Filed: Mar. 7, 2018

(65) Prior Publication Data

US 2018/0259788 A1 Sep. 13, 2018

Related U.S. Application Data

(60) Provisional application No. 62/468,898, filed on Mar. 8, 2017.

(51) Int. Cl.
*G02B 27/64* (2006.01)
*G02B 26/08* (2006.01)

(52) U.S. Cl.
CPC ....... *G02B 27/646* (2013.01); *G02B 26/0891* (2013.01)

(58) Field of Classification Search
CPC .......................... G02B 27/646; G02B 26/0891
See application file for complete search history.

(56) References Cited

U.S. PATENT DOCUMENTS

| 2006/0093339 | A1  | 5/2006 | Umezu |
| 2011/0051243 | A1* | 3/2011 | Su ........................ G02B 27/646 |
|              |     |        | 359/555 |
| 2017/0242225 | A1  | 8/2017 | Fiske |

FOREIGN PATENT DOCUMENTS

| TW | M376769    | 3/2010  |
| TW | 201346372  | 11/2013 |

OTHER PUBLICATIONS

"Office Action of Taiwan Counterpart Application", dated May 29, 2018, p. 1-p. 6.

* cited by examiner

*Primary Examiner* — Wen Huang
(74) *Attorney, Agent, or Firm* — JCIPRNET

(57) ABSTRACT

A lens module including a light path altering element, a first lens assembly, a first sensor and at least one group of electronically controlled deformation element is provided. An image beam incident to the optical path altering element is diverted from a first light transmission path to a second light transmission path. The first lens assembly is disposed between the light path altering element and the first sensor. The at least one group of electronically controlled deformation element is connected to the light path altering element, and deformation of the at least one group of electronically controlled deformation element makes the light path altering element to move.

8 Claims, 7 Drawing Sheets

LENS MODULE

CROSS-REFERENCE TO RELATED APPLICATION

This application claims the priority benefit of U.S. provisional application Ser. No. 62/468,898, filed on Mar. 8, 2017. The entirety of the above-mentioned patent application is hereby incorporated by reference herein and made a part of this specification.

BACKGROUND OF THE INVENTION

Field of the Invention

The invention relates to an optical module, and particularly relates to a lens module.

Description of Related Art

Along with development of technology, the camera device is developed towards a trend of lightness, slimness, shortness and smallness, so as to facilitate the portability. In the camera device, a lens module occupies a rather large volume. Therefore, to reduce the volume of the lens module becomes a key factor of reducing the volume of the camera device. Moreover, in order to deal with hand shake, the lens module generally has a design of image stabilization. Currently, a voice coil motor (VCM) is generally adopted to drive a lens assembly (or a sensor) to shift relative to the sensor (or the lens assembly) to compensate for image shift caused by the hand shake. However, such design may increase power consumption, cost and the volume of the lens module.

SUMMARY OF THE INVENTION

The invention is directed to a lens module, which has lower power consumption, cost and volume.

The invention provides a lens module including a light path altering element, a first lens assembly, a first sensor and at least one group of electronically controlled deformation element. An image beam incident to the light path altering element is diverted from a first light transmission path to a second light transmission path. The first lens assembly is disposed between the light path altering element and the first sensor. The at least one group of electronically controlled deformation element is connected to the light path altering element, and deformation of the at least one group of electronically controlled deformation element makes the light path altering element to move.

According to the above description, by disposing the light path altering element to alter the light transmission path, the first lens assembly and the first sensor are capable of being arranged along a direction parallel to a light incident surface of the lens module, so as to effectively decrease a thickness of the lens module. Moreover, at least one group of electronically controlled deformation element is adopted to move the light path altering element to compensate for the hand shake, which effectively reduces the power consumption, and avails reducing the required elements, so as to reduce the cost. Therefore, the lens module according to the embodiment of the invention is compact in size, and has lower power consumption and the reduced production cost.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In a camera device, a lens module occupies a rather large volume, especially for the long-focus lens module adapted to take a long-distance image, e.g. a telephoto camera. Therefore, a lens module integrated with a light path altering element is provided to fold a light transmission path of a camera lens system to reduce the volume or thickness of the lens module, such that the lens module is easy to be installed in the camera device.

Figure 1A:
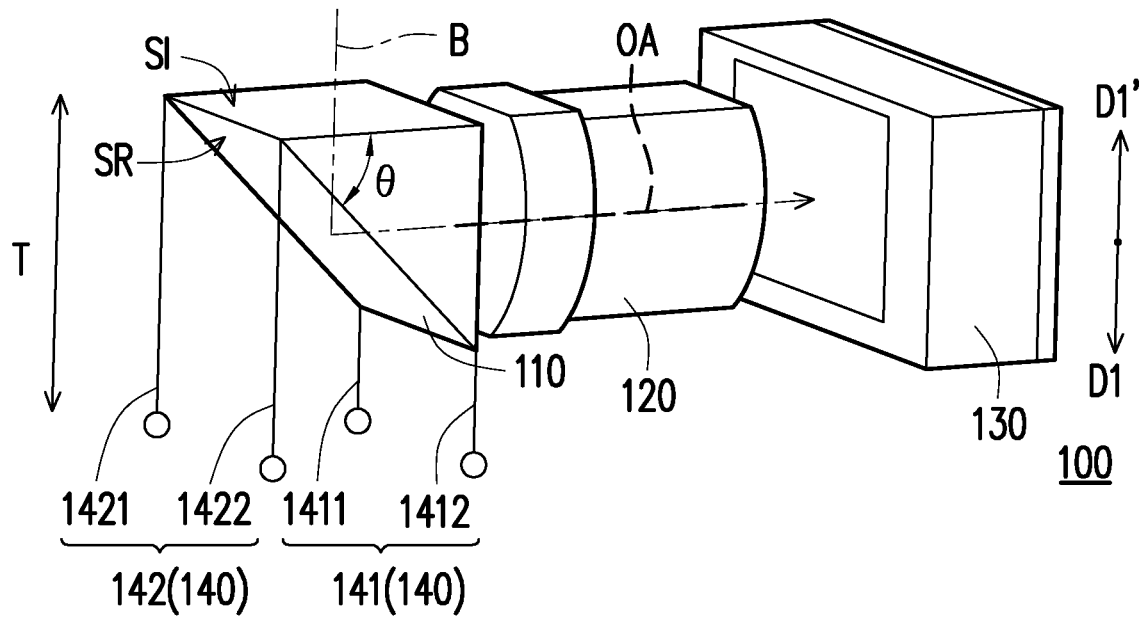
FIG. 1A is a schematic diagram of a lens module according to an embodiment of the invention.

FIG. 1A is a schematic diagram of a lens module according to an embodiment of the invention. Referring to FIG. 1A, a lens module 100 includes a light path altering element 110, a first lens assembly 120, a first sensor 130 and at least one group of electronically controlled deformation element 140.

The light path altering element 110 is adapted to divert an image beam B transmitted to the lens module 100, such that the image beam B incident to the light path altering element 110 is diverted from a first light transmission path (referring to a light transmission path of the image beam B incident to the light path altering element 110 after entering the lens module 100) to a second light transmission path (referring to a light transmission path of the image beam B incident to the first sensor 130 from the light path altering element 110), and the image beam B is transmitted towards the first lens assembly 120. In the embodiment, the light path altering element 110 is a prism, and an included angle θ between a reflection surface SR of the light path altering element 110 and a light incident surface SI of the light path altering element 110 is 45 degrees, such that the image beam B transmitted to the light path altering element 110 is diverted by 90 degrees through the reflection (for example, a total internal reflection) of the reflection surface SR and transmitted towards the first lens assembly 120. Namely, the first light transmission path of the image beam B is perpendicular to the second light transmission path of the image beam B. However, the included angle θ between the reflection surface SR and the light incident surface SI and the type of the light path altering element 110 may be changed according to an implementation requirement, and are not limited to the embodiment of FIG. 1A. For example, the light path altering element 110 may be a reflection mirror, a beam splitter or any other element adapted to change the light transmission path of the image beam B.

If the light path altering element 110 is not disposed in the system, the first lens assembly 120 and the first sensor 130 have to be arranged along the light transmission path of the image beam B incident to the lens module 100. Namely, the first lens assembly 120 and the first sensor 130 have to be arranged along a thickness direction of the lens module 100 (corresponding to a first direction D1 shown in FIG. 1A), which inevitably causes increase of a thickness T of the lens module 100. By using the light path altering element 110 to divert the image beam B, the first lens assembly 120 and the first sensor 130 may be arranged along a direction parallel to a light incident surface of the lens module 100 (for example, the light incident surface SI of the light path altering element 110), so as to effectively decrease the thickness T of the lens module 100.

The first lens assembly 120 is disposed on a light transmission path of the light path altering element 110, and the first lens assembly 120 is, for example, disposed between the light path altering element 110 and the first sensor 120, so as to transmit the image beam B coming from the light path altering element 110 to the first sensor 120. For example, the first lens assembly 120 may include one or a plurality of lens elements.

The first sensor 130 is disposed on a light transmission path of the first lens assembly 120 to receive the image beam B coming from the first lens assembly 120. For example, the first sensor 130 may include a charge coupled device (CCD) or a complementary metal oxide semiconductor (CMOS) device, though the invention is not limited thereto.

The at least one group of electronically controlled deformation element 140 is connected to the light path altering element 110, and deformation of the at least one group of electronically controlled deformation element 140 makes the light path altering element 110 to move. Further, each group of the electronically controlled deformation element 140 includes at least one shape memory alloy (SMA) wire. Two ends of each of the SMA wires are respectively fixed or adhered to the light path altering element 110 and a fixing end outside the light path altering element 110 (for example, a casing for containing the aforementioned elements or other mechanism), so as to limit a position and an orientation of the light path altering element 110.

Based on a characteristic that SMA material deforms, for example, in length when heated, a current input to the SMA wire may be adjusted to change a length of the SMA wire, so as to change the orientation of the light path altering element 110 (a facing direction of the reflection surface SR). To be specific, when a current is supplied to the SMA wire, the SMA wire is contracted or shortened under heat (heat produced by a resistance thereof), and thus pulls the light path altering element 110 to move towards the fixing end of the SMA wire. On the other hand, when the current input to the SMA wire is reduced, the SMA wire is cooled and prolonged, and thus the light path altering element 110 is pushed back to an original position (i.e. moved towards a direction away from the fixing end of the SMA wire). Therefore, the at least one group of electronically controlled deformation element 140 is applied to drive the light path altering element 110 to tilt or rotate, so as to compensate for shift of the image beam B received by the first sensor 130 and thus to stabilize a captured image.

Figure 1B:
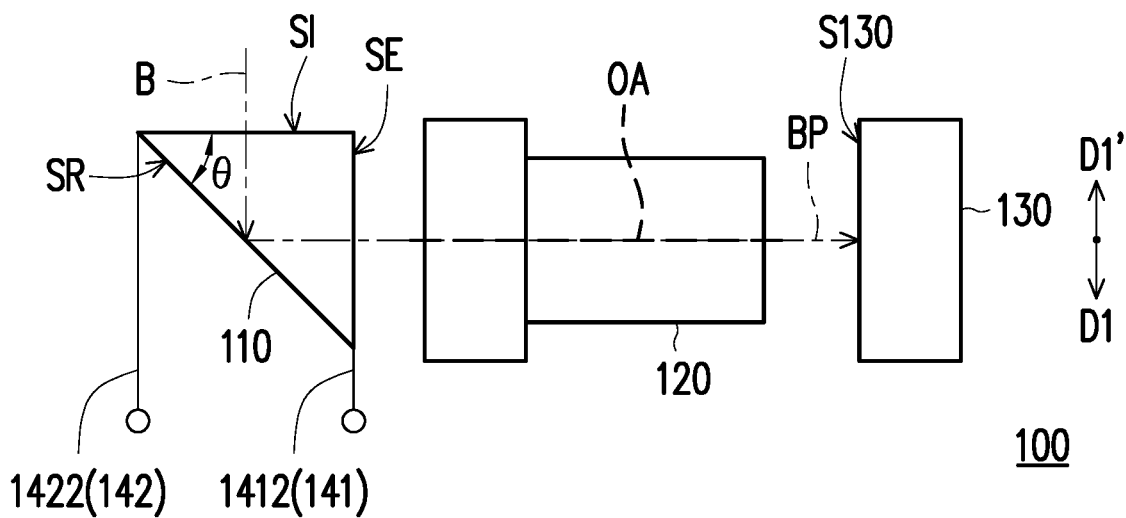
FIG. 1B to FIG. 1D are side views of the lens module of FIG. 1A, in which light transmission paths in case of non-rotation, clockwise rotation and anticlockwise rotation of the light path altering element are respectively illustrated.
Figure 1C:
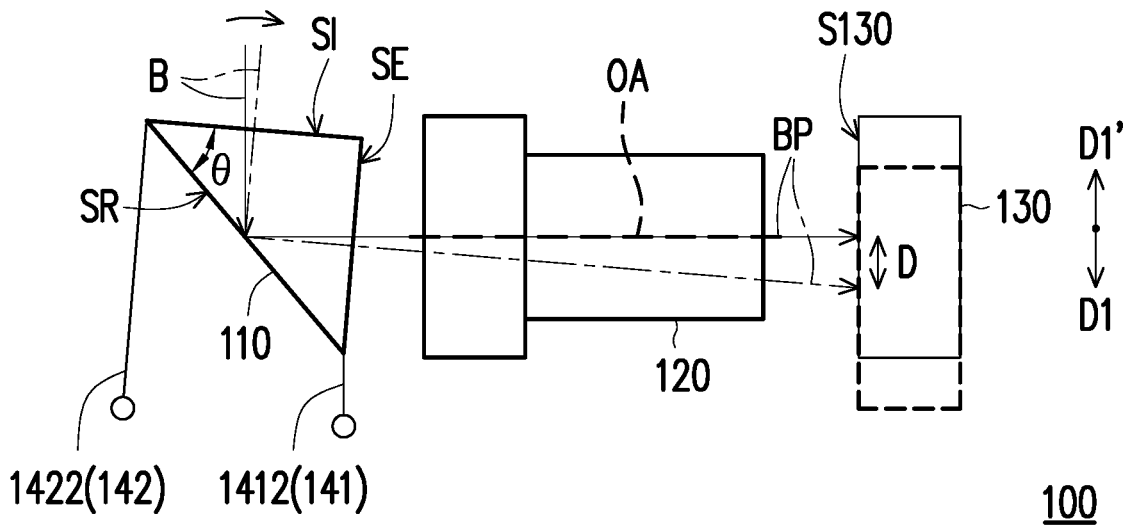
Figure 1D:
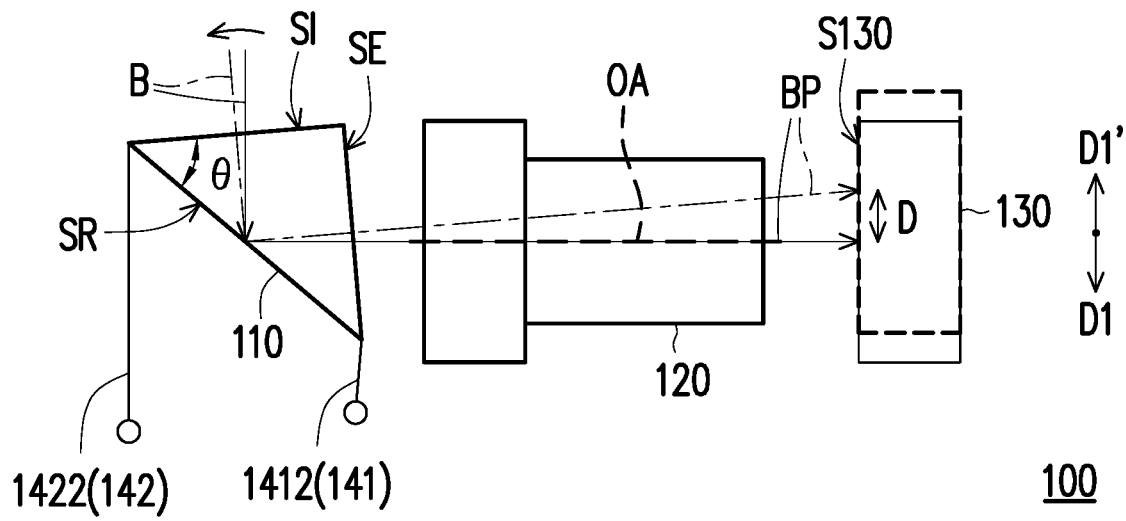

FIG. 1B to FIG. 1D are side views of the lens module of FIG. 1A, in which light transmission paths in case of non-rotation, clockwise rotation and anticlockwise rotation of the light path altering element are respectively illustrated. Referring to FIG. 1A to FIG. 1D, the lens module 100, for example, includes a first group of electronically controlled deformation element 141 and a second group of electronically controlled deformation element 142, where the first group of electronically controlled deformation element 141 includes an SMA wire 1411 and an SMA wire 1412, and the second group of electronically controlled deformation element 142 includes an SMA wire 1421 and an SMA wire 1422. The SMA wire 1411 and the SMA wire 1412 are respectively fixed on two ends of the reflection surface SR close to a light emitting surface SE, and the SMA wire 1421 and the SMA wire 1422 are respectively fixed on two ends of the reflection surface SR close to the light incident surface SI of the light path altering element 110.

In FIG. 1B to FIG. 1D, only the image beam B normally incident to the light incident surface SI is schematically illustrated. In case of no hand shake, as shown in FIG. 1B, a center of a light receiving surface S130 of the first sensor 130 is located on an optical path OA of the first lens assembly 120, so that after the image beam B incident to the light path altering element 110 is reflected by the reflection surface SR and passes through the first lens assembly 120, the image beam B is received by the first sensor 130. In case of the hand shake, as shown in FIG. 1C and FIG. 1D, the first sensor 130 may be shifted in the first direction D1 or the opposite direction D1' thereof and cannot capture a complete image. Therefore, deformation of the first group of electronically controlled deformation element 141 or the second group of electronically controlled deformation element 142 is required to change a second light transmission path BP of the light path altering element 110. In FIG. 1C and FIG. 1D, the changed second light transmission path BP is illustrated in a dot-dash line.

Further, as shown in FIG. 1C, when the first sensor 130 is deviated by a distance (for example, a distance D) along the first direction D1, it may be regarded as that an image (not shown) on the first sensor 130 is deviated by the distance D along the opposite direction D1' of the first direction D1. In this case, a current may be applied to the SMA wire 1411 and the SMA wire 1412 of the first group of electronically controlled deformation element 141, and no current may be applied to the SMA wire 1421 and the SMA wire 1422 of the second group of electronically controlled deformation element 142. The SMA wire 1411 and the SMA wire 1412 may be contracted due to the heat, such that the light path altering element 110 is moved towards the fixing end of the first group of electronically controlled deformation element 141 (for example, to rotate in a clockwise direction), and the second light transmission path BP of the light path altering element 110 is moved towards the first direction D1, so as to compensate for the shift of the first sensor 130 in the first direction D1 (i.e. to compensate for deviation of the image in the opposite direction D1' of the first direction D1).

On the other hand, as shown in FIG. 1D, when the first sensor 130 is deviated by a distance (for example, a distance D) along the opposite direction D1' of the first direction D1, it may be regarded as that the image on the first sensor 130 is deviated by the distance D along the first direction D1. In this case, a current may be applied to the SMA wire 1421 and the SMA wire 1422 of the second group of electronically controlled deformation element 142, while no current may be applied to the SMA wire 1411 and the SMA wire 1412 of the first group of electronically controlled deformation element 141. The SMA wire 1421 and the SMA wire 1422 may be contracted due to the heat, such that the light path altering element 110 is moved towards the fixing end of the second group of electronically controlled deformation element 142 (for example, to rotate in an anticlockwise direction), and the second light transmission path BP of the light path altering element 110 is moved towards the opposite direction D1' of the first direction D1, so as to compensate for the shift of the first sensor 130 in the opposite direction D1' of the first direction D1 (i.e. to compensate for deviation of the image in the first direction D1).

In other words, the deformation of the first group of electronically controlled deformation element 141 drives the second light transmission path BP of the light path altering element 110 to shift towards the first direction D1, and the deformation of the second group of electronically controlled deformation element 142 drives the second light transmission path BP of the light path altering element 110 to shift towards the opposite direction D1' of the first direction D1, where the first direction D1 and the opposite direction D1' thereof are perpendicular to the optical axis OA of the first lens assembly 120 and parallel to the light receiving surface S130 of the first sensor 130.

Compared to a voice coil motor (VCM) adopted to drive the lens assembly (or the sensor) to shift relative to the sensor (or the lens assembly) to compensate for the image shift caused by the hand shake, the embodiment adopts the at least one group of electronically controlled deformation element 140 to drive the light path altering element 110 to move (for example, to tilt or rotate), so as to compensate for the hand shake or user's hand motion. Thus, the VCM is not required in this embodiment, and power consumption and cost of the device are effectively reduced.

It should be noted that the number of groups of the electronically controlled deformation element, the number of the SMA wires in each group of the electronically controlled deformation element, a relative configuration relationship of each SMA wire and the light path altering element and the method for fixing each SMA wire to the light path altering element may be changed according to an actual requirement, and are not limited to the embodiment of FIG. 1A to FIG. 1D.

Moreover, in an embodiment, the at least one group of electronically controlled deformation element may be coupled to a driving circuit (not shown). The driving circuit is adapted to output a current to the at least one group of electronically controlled deformation element according to a shift amount of the image beam received by the first sensor, so as to deform the at least one group of electronically controlled deformation element to accordingly drive the light path altering element to move. The following embodiments are also adapted to the above amelioration, and details thereof are not repeated.

Other implementations of the lens module are described below with reference of FIG. 2 to FIG. 7. However, the implementations of the lens module of the invention are not limited thereto. In FIG. 2 to FIG. 7, the same components are denoted by the same referential numbers, and details thereof are not repeated. FIG. 2 FIG. 3, FIG. 4A, FIG. 5, FIG. 6 and FIG. 7 are respectively schematic diagrams of lens modules according to other embodiments of the invention. FIG. 4B to FIG. 4D are top views of the lens module in FIG. 4A, in which light transmission paths in case of non-rotation, anticlockwise rotation and clockwise rotation of the light path altering element are respectively illustrated.

Figure 2:
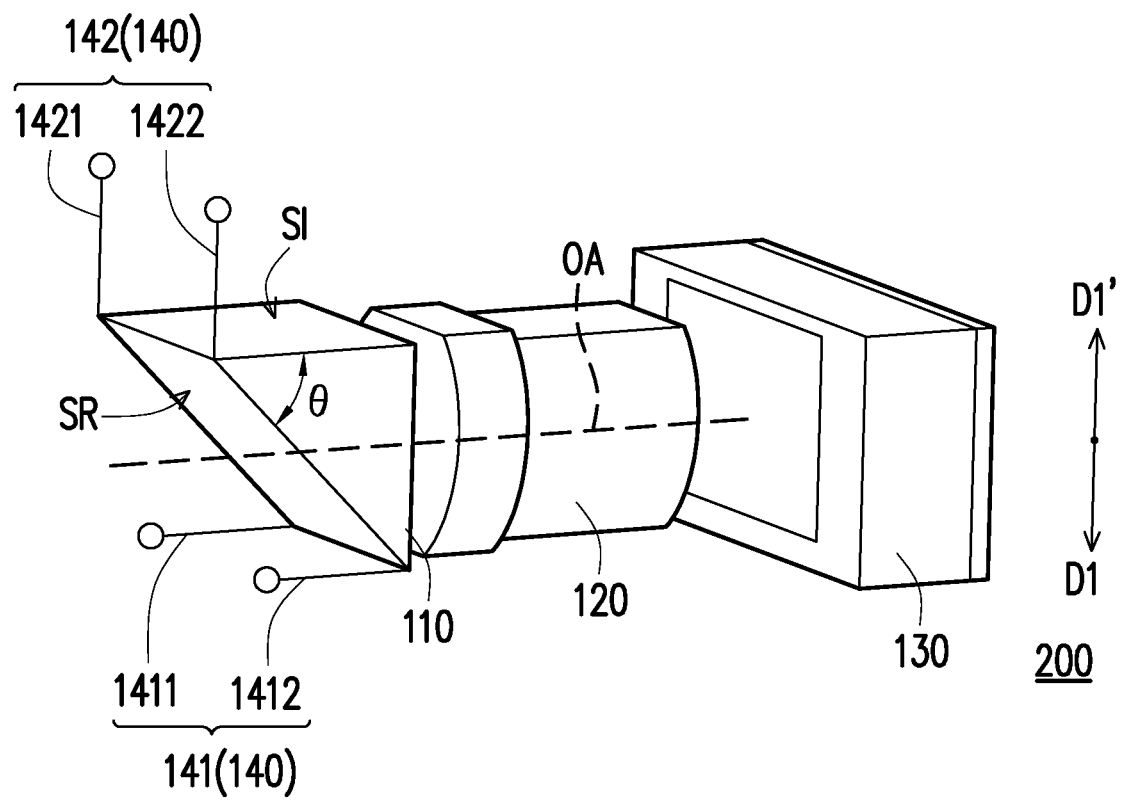
FIG. 2, FIG. 3, FIG. 4A, FIG. 5, FIG. 6 and FIG. 7 are respectively schematic diagrams of lens modules according to other embodiments of the invention.

Referring to FIG. 2, a main difference between a lens module 200 and the lens module 100 of FIG. 1A is as follows. In the lens module 100, extending directions of the SMA wire 1411, the SMA wire 1412, the SMA wire 1421 and the SMA wire 1422 are perpendicular to the optical axis OA of the first lens assembly 120, and all extend downward from the reflection surface SR of the light path altering element 110. On the other hand, in the lens module 200, extending directions of the SMA wire 1411 and the SMA wire 1412 are all parallel to the optical axis OA of the first lens assembly 120, and extending directions of the SMA wire 1421 and the SMA wire 1422 are perpendicular to the optical axis OA of the first lens assembly 120. Moreover, the SMA wire 1421 and the SMA wire 1422 all extend upward from the light incident surface SI of the light path altering element 110.

Figure 3:
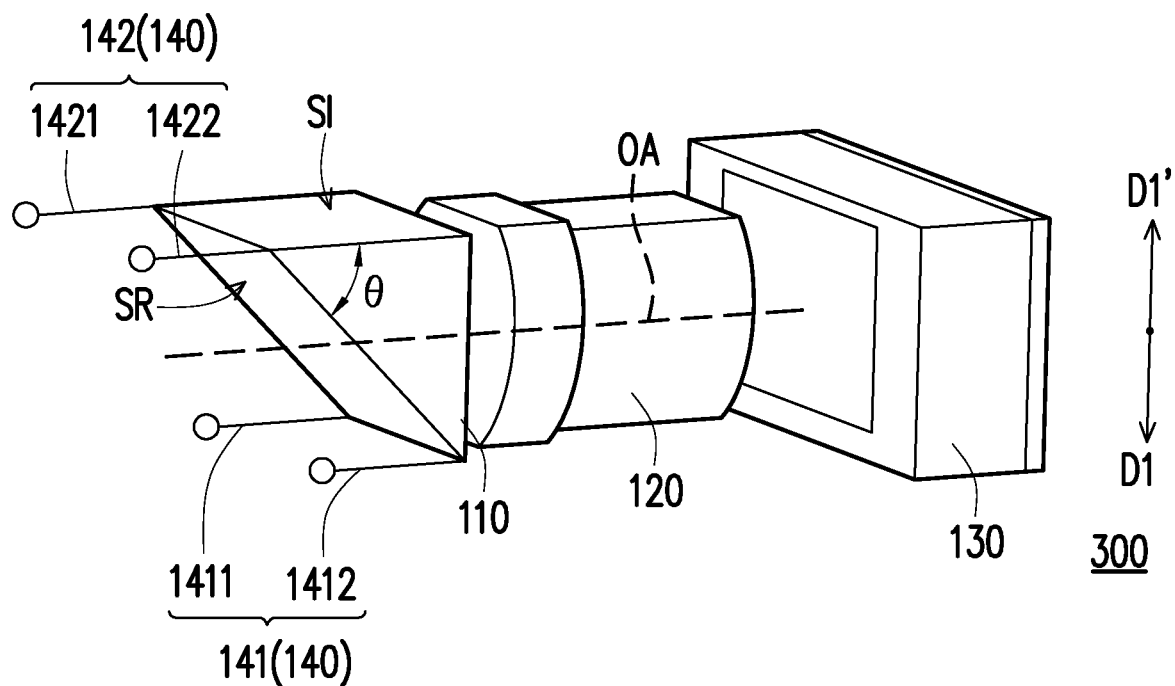

Referring to FIG. 3, a main difference between a lens module 300 and the lens module 100 of FIG. 1A is as follows. In the lens module 300, extending directions of the SMA wire 1411, the SMA wire 1412, the SMA wire 1421 and the SMA wire 1422 are all parallel to the optical axis OA of the first lens assembly 120.

In the above embodiments, the first group of electronically controlled deformation element 141 and the second group of electronically controlled deformation element 142 are used for compensating for image shift on the first direction D1 and the opposite direction D1' thereof, and the first direction D1 and the opposite direction D1' thereof, for example, correspond to a Y-axis direction (a vertical direction) of the first sensor 130, though the invention is not limited thereto. In another embodiment, as shown in FIG. 4A to FIG. 4D, the first direction D1 and the opposite direction D1' thereof may also correspond to an X-axis direction (a horizontal direction) of the first sensor 130.

Referring to FIG. 4A to FIG. 4D, a main difference between a lens module 400 and the lens module 300 of FIG. 3 is as follows. In the lens module 400, the SMA wire 1411 and the SMA wire 1412 are respectively fixed on two ends of a first side surface S1 of the light path altering element 110 close to the reflection surface SR, and the SMA wire 1421 and the SMA wire 1422 are respectively fixed on two ends of a second side surface S2 of the light path altering element 110 close to the reflection surface SR. Under such framework, the first group of electronically controlled deformation element 141 and the second group of electronically controlled deformation element 142 are used for compensating for image shift on the first direction D1 and the opposite direction D1' thereof, and the first direction D1 and the opposite direction D1' thereof correspond to the X-axis direction of the first sensor 130.

In FIG. 4B to FIG. 4D, only the image beam B normally incident to the light incident surface SI is schematically illustrated. In case of no hand shake, as shown in FIG. 4B, the center of the light receiving surface S130 of the first sensor 130 is located on the optical path OA of the first lens assembly 120, so that after the image beam B incident to the light path altering element 110 is reflected by the reflection surface SR and passes through the first lens assembly 120, the image beam B is received by the first sensor 130. In case of the hand shake, as shown in FIG. 4C and FIG. 4D, the first sensor 130 is probably shifted in the first direction D1 or the opposite direction D1' thereof and cannot capture a complete image. Therefore, deformation of the first group of electronically controlled deformation element 141 or the second group of electronically controlled deformation element 142 is required to change the second light transmission path BP of the light path altering element 110. In FIG. 4C and FIG. 4D, the changed second light transmission path BP is illustrated in a dot-dash line.

Further, as shown in FIG. 4C, when the first sensor 130 is deviated by a distance (for example, a distance D) along the first direction D1, it may be regarded as that the image (not shown) on the first sensor 130 is deviated by the distance D along the opposite direction D1' of the first direction D1. In this case, a current may be applied to the SMA wire 1411 and the SMA wire 1412 of the first group of electronically controlled deformation element 141, and does not apply current to the SMA wire 1421 and the SMA wire 1422 of the second group of electronically controlled deformation element 142. The SMA wire 1411 and the SMA wire 1412 may be contracted due to the heat, such that the light path altering element 110 is moved towards the fixing end of the first group of electronically controlled deformation element 141 (for example, to rotate in the anticlockwise direction), and the second light transmission path BP of the light path altering element 110 is moved towards the first direction D1, so as to compensate for the shift of the first sensor 130 in the first direction D1 (i.e. to compensate for deviation of the image in the opposite direction D1' of the first direction DD.

On the other hand, as shown in FIG. 4D, when the first sensor 130 is deviated by a distance (for example, a distance D) along the opposite direction D1' of the first direction D1, it may be regarded as that the image is deviated by the distance D along the first direction D1. In this case, a current may be applied to the SMA wire 1421 and the SMA wire 1422 of the second group of electronically controlled deformation element 142, and does not apply current to the SMA wire 1411 and the SMA wire 1412 of the first group of electronically controlled deformation element 141. The SMA wire 1421 and the SMA wire 1422 may be contracted due to the heat, such that the light path altering element 110 is moved towards the fixing end of the second group of electronically controlled deformation element 142 (for example, to rotate in the clockwise direction), and the second light transmission path BP of the light path altering element 110 is moved towards the opposite direction D1' of the first direction D1, so as to compensate for the shift of the first sensor 130 in the opposite direction D1' of the first direction D1 (i.e. to compensate for deviation of the image in the first direction D1).

Figure 4A:
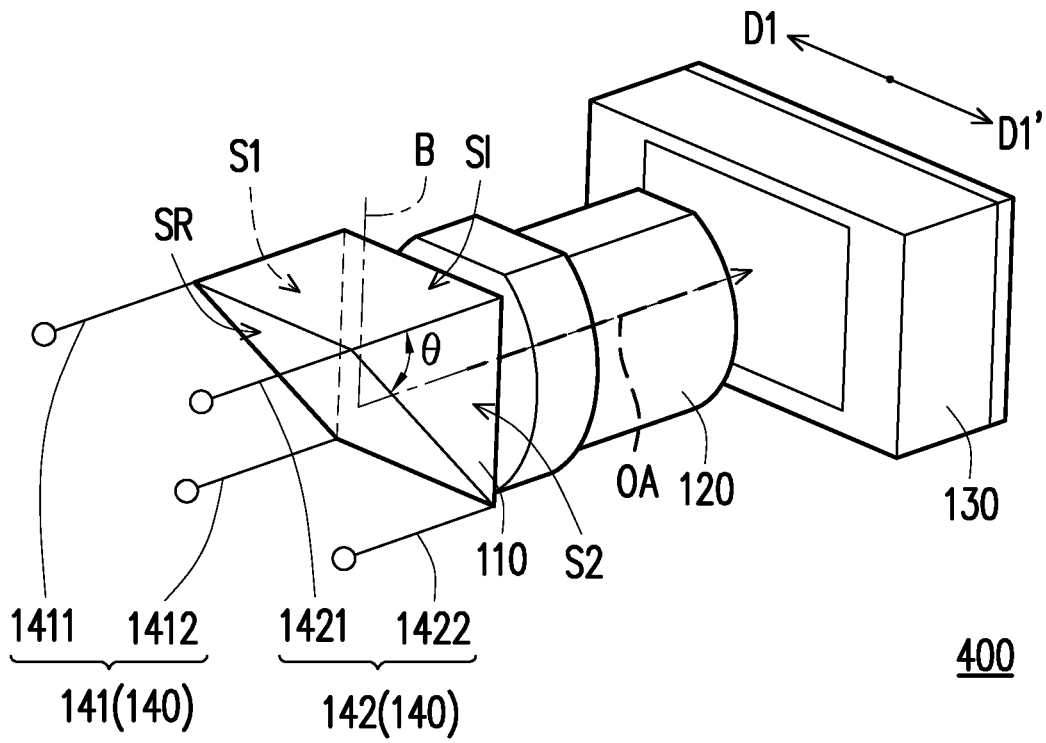
Figure 4B:
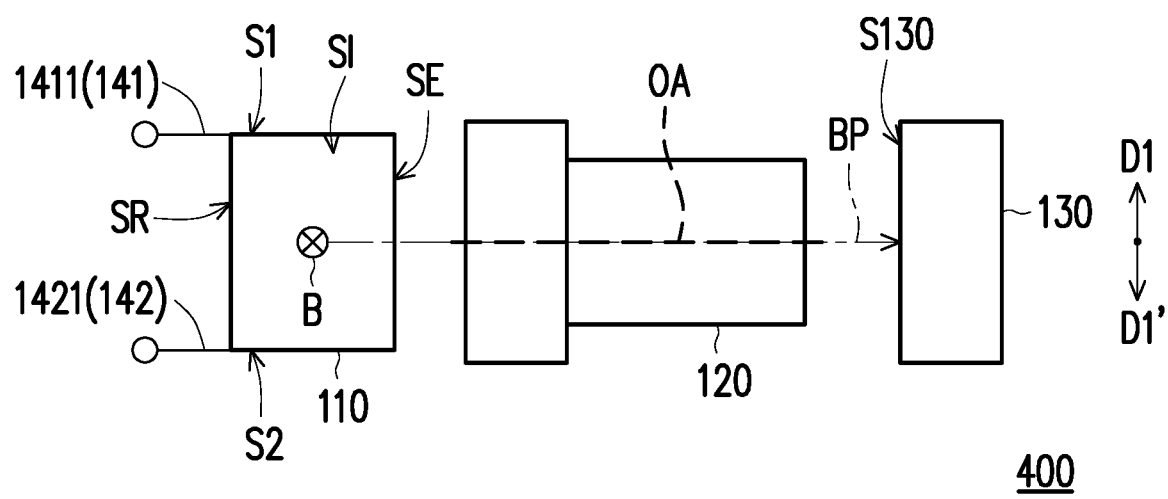
FIG. 4B to FIG. 4D are top views of the lens module in FIG. 4A, in which light transmission paths in case of non-rotation, anticlockwise rotation and clockwise rotation of the light path altering element are respectively illustrated.
Figure 4C:
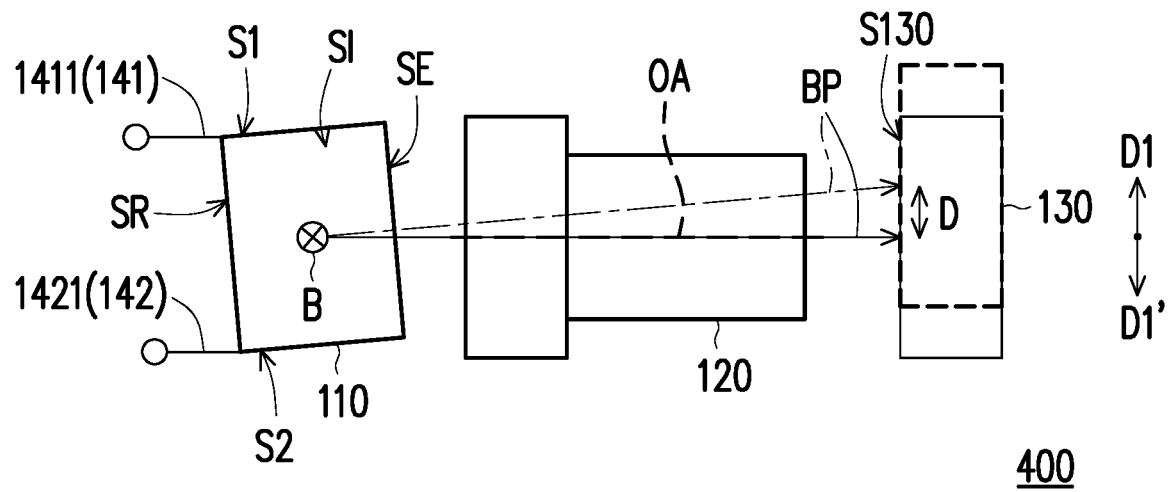
Figure 4D:
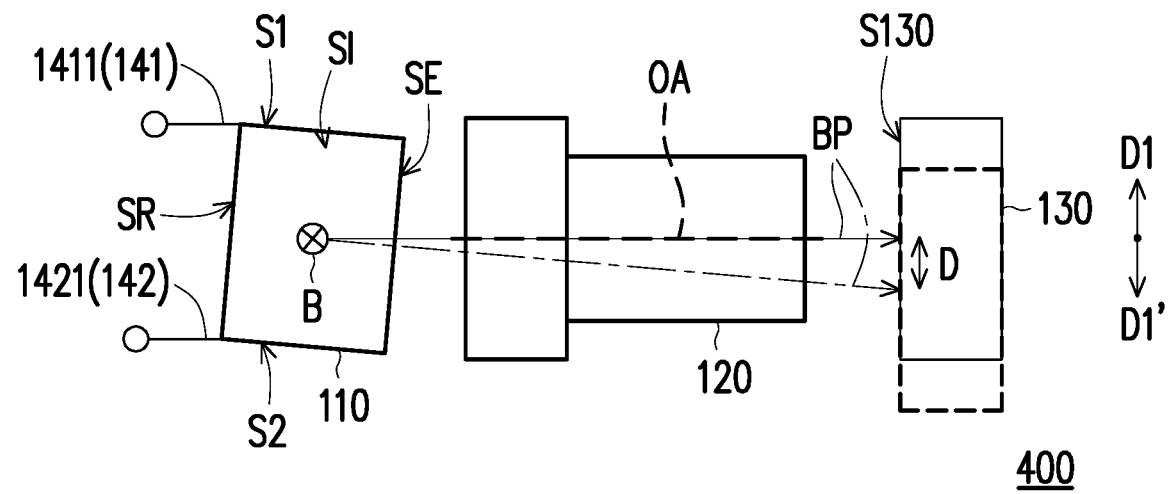
Figure 5:
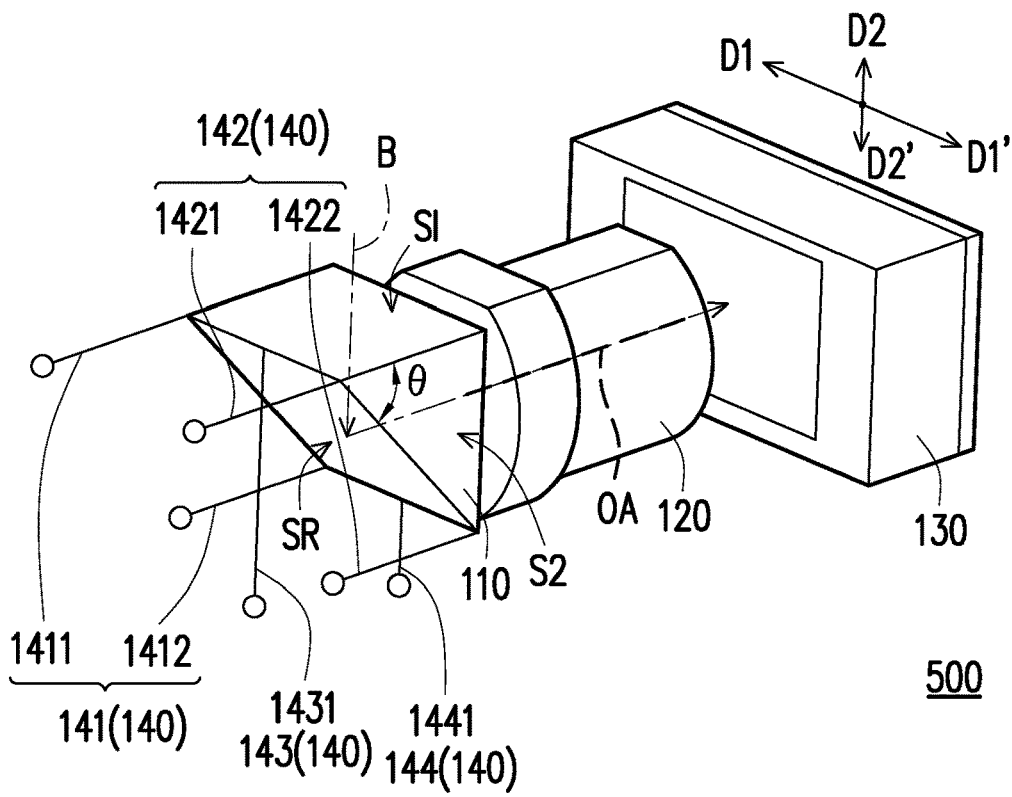

Referring to FIG. 5, a main difference between a lens module 500 and the lens module 400 of FIG. 4 is as follows. In the lens module 500, the at least one group of electronically controlled deformation element 140 further includes a third group of electronically controlled deformation element 143 and a fourth group of electronically controlled deformation element 144, where deformation of the third group of electronically controlled deformation element 143 makes the second light transmission path BP of the light path altering element 110 to move towards a second direction D2, and deformation of the fourth group of electronically controlled deformation element 144 makes the second light transmission path BP of the light path altering element 110 to move towards the opposite direction D2' of the second direction D2, where the second direction D2 is perpendicular to the first direction D1, and the second direction D2 and the opposite direction D2' thereof are perpendicular to the optical axis OA of the first lens assembly 120 and parallel to the light receiving surface S130 of the first sensor 130. Further, the first group of electronically controlled deformation element 141 and the second group of electronically controlled deformation element 142 are, for example, used for compensating for image shift on the X-axis direction of the first sensor 130, and the third group of electronically controlled deformation element 143 and the fourth group of electronically controlled deformation element 144 are, for example, used for compensating for image shift on the Y-axis direction of the first sensor 130.

In the embodiment, the third group of electronically controlled deformation element 143 includes an SMA wire 1431, and the fourth group of electronically controlled deformation element 144 includes an SMA wire 1441, where the SMA wire 1431 is fixed at a middle point of an edge of the reflection surface SR close to the light incident surface SI, and the SMA wire 1441 is fixed at a middle point of an edge of the reflection surface SR close to the light emitting surface SE. Moreover, extending directions of the SMA wire 1431 and the SMA wire 1441 are perpendicular to the optical axis OA of the first lens assembly 120.

However, the number of the SMA wires in each group of the electronically controlled deformation element, a relative configuration relationship of each SMA wire and the light path altering element and the method for fixing each SMA wire to the light path altering element may be changed according to an actual requirement, and are not limited to the embodiment of FIG. 5. For example, in another embodiment, the number of the SMA wires included in at least one of the third group of electronically controlled deformation element 143 and the fourth group of electronically controlled deformation element 144 may be increased, such that a force exerted on the light path altering element 110 by at least one of the third group of electronically controlled deformation element 143 and the fourth group of electronically controlled deformation element 144 may be more even, so as to stably move the light path altering element 110.

Figure 6:
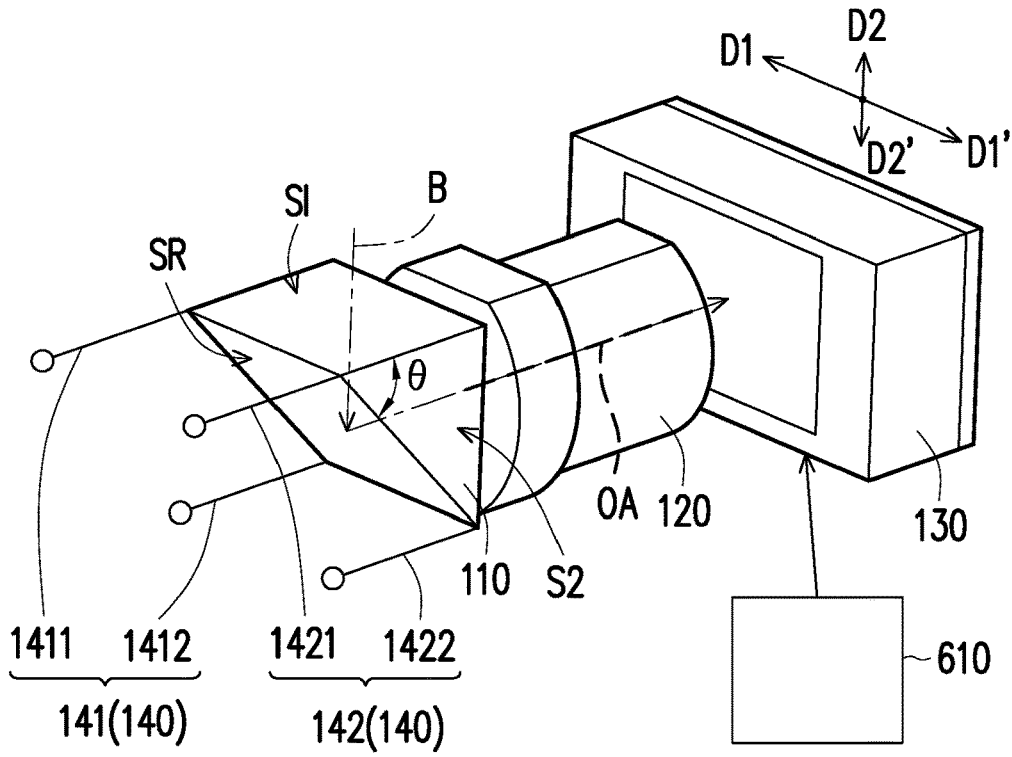

Referring to FIG. 6, a main difference between a lens module 600 and the lens module 400 of FIG. 4A is as follows. The lens module 600 further includes an actuator 610. The actuator 610 is coupled to the first sensor 130 and controls the first sensor 130 to move along the second direction D2 and the opposite direction D2' thereof. In another embodiment, the actuator 610 may be coupled to the first lens assembly 120 but is not coupled to the first sensor 130, so as to control the first lens assembly 120 to move along the second direction D2 and the opposite direction D2' thereof. For example, the actuator 610 may include a voice coil motor or another group of electronically controlled deformation element (for example, a SMA wire), though the invention is not limited thereto.

In the embodiment, the first group of electronically controlled deformation element 141 and the second group of electronically controlled deformation element 142 are, for example, used for compensating for image shift on the X-axis direction of the first sensor 130, and the actuator 610 is, for example, used for compensating for image shift on the Y-axis direction of the first sensor 130, though the invention is not limited thereto. In other embodiments, an actuator used for compensating for image shift on the X-axis direction of the first sensor 130 may be further configured under the framework of the lens module 100 of FIG. 1A, the lens module 200 of FIG. 2 or the lens module 300 of FIG. 3.

Figure 7:
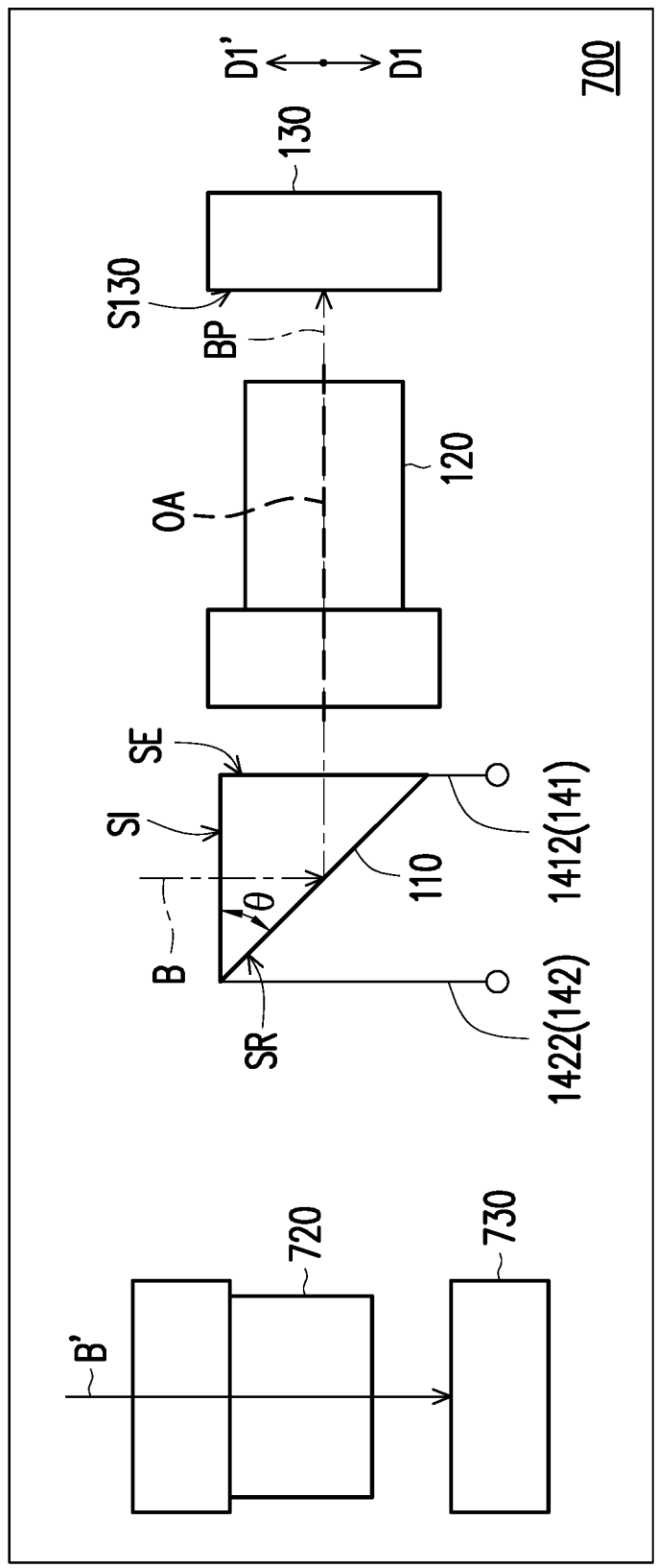

Referring to FIG. 7, a main difference between a lens module 700 and the lens module 100 of FIG. 1B is as follows. The lens module 700 can be a dual camera system, and further includes a second lens assembly 720 and a second sensor 730. The second lens assembly 720 is adapted to transmit an image beam B' coming from external to the second sensor 730. For example, the second lens assembly 720 may include one or a plurality of lens elements. The second sensor 730 is disposed on a light transmission path of the second lens assembly 720 to receive the image beam B' coming from the second lens assembly 720. For example, the second sensor 730 may include a CCD or a CMOS device, though the invention is not limited thereto. Under the framework of FIG. 7, the first sensor 130 and the second sensor 730 may have different applications. For example, the second sensor 730 may be used for general photographing, and the first sensor 130 may be used for depth sensing. In this case, the first sensor 130 may be a time-of-flight (TOF) sensor, though the invention is not limited thereto. Alternatively, the first sensor 130 is used for a folded telephoto camera photographing long-distance images, and the second sensor 730 is used for a non-folded wide-angle camera photographing wide angle images, though the invention is also not limited thereto.

In summary, by disposing the light path altering element to alter the light transmission path, the first lens assembly and the first sensor are capable of being arranged along a direction parallel to a light incident surface of the lens module, so as to effectively decrease a thickness of the lens module. Moreover, at least one group of electronically controlled deformation element is adopted to control the move of the light path altering element to compensate for the hand shake and stabilize an image captured by the first sensor, which effectively reduces the power consumption, and avails reducing the required elements, thereby reducing the cost. Therefore, the lens modules according to the embodiments of the invention are compact in size, and have lower power consumption and the reduced production cost. In an embodiment, two groups of electronically controlled deformation elements may be adopted to compensate for the image shift on the X-axis direction or the Y-axis direction of the first sensor. In another embodiment, four groups of electronically controlled deformation elements may be adopted to compensate for the image shift on both of the X-axis direction and the Y-axis direction of the first sensor. In still another embodiment, two groups of electronically controlled deformation elements may be adopted to compensate for the image shift on the X-axis direction (or the Y-axis direction) of the first sensor, and an actuator coupled to the first sensor or the first lens assembly may be configured to compensate for the image shift on the Y-axis direction (or the X-axis direction) of the first sensor. In further another embodiment, a second lens assembly and a second sensor may be configured to provide a different application.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A lens module, comprising:
    a light path altering element, diverting an image beam incident to the light path altering element from a first light transmission path to a second light transmission path;
    a first lens assembly;
    a first sensor, wherein the first lens assembly is disposed between the light path altering element and the first sensor;
    at least one group of electronically controlled deformation element, connected to the light path altering element, and deformation of the at least one group of electronically controlled deformation element making the light path altering element to move,
    wherein the at least one group of electronically controlled deformation element comprises a first group of electronically controlled deformation element and a second group of electronically controlled deformation element, deformation of the first group of electronically controlled deformation element makes the second light transmission path to shift towards a first direction, and deformation of the second group of electronically controlled deformation element makes the second light transmission path to shift towards an opposite direction of the first direction, wherein the first direction and the opposite direction thereof are perpendicular to an optical axis of the first lens assembly and parallel to a light receiving surface of the first sensor; and
    an actuator, coupled to the first sensor or the first lens assembly, and driving the first sensor or the first lens assembly to move along a second direction or an opposite direction thereof, wherein the second direction is perpendicular to the first direction, and the second direction and the opposite direction thereof are perpendicular to the optical axis of the first lens assembly and parallel to the light receiving surface of the first sensor.

2. The lens module as claimed in claim 1, wherein the light path altering element is a prism, a reflection mirror or a beam splitter.

3. The lens module as claimed in claim 1, wherein the at least one group of electronically controlled deformation element drives the light path altering element to tilt or rotate, so as to compensate for a shift of the image beam received by the first sensor.

4. The lens module as claimed in claim 1, wherein each of the at least one group of electronically controlled deformation element comprises at least one shape memory alloy wire.

5. The lens module as claimed in claim 4, wherein two ends of the at least one shape memory alloy wire are respectively fixed to the light path altering element and a fixing end outside the light path altering element.

6. The lens module as claimed in claim 1, wherein the at least one group of electronically controlled deformation element further comprises a third group of electronically controlled deformation element and a fourth group of electronically controlled deformation element, deformation of the third group of electronically controlled deformation element makes the second light transmission path to shift towards a second direction, and deformation of the fourth group of electronically controlled deformation element makes the second light transmission path to shift towards an opposite direction of the second direction, wherein the second direction is perpendicular to the first direction, and the second direction and the opposite direction thereof are perpendicular to the optical axis of the first lens assembly and parallel to the light receiving surface of the first sensor.

7. The lens module as claimed in claim 1, wherein the at least one group of electronically controlled deformation element is coupled to a driving circuit, and the driving circuit outputs a current to the at least one group of electronically controlled deformation element according to a shift amount of the image beam received by the first sensor, so as to deform the at least one group of electronically controlled deformation element to move the light path altering element.

8. The lens module as claimed in claim 1, further comprising:
    a second lens assembly; and a second sensor, disposed on a light transmission path of the second lens assembly.

* * * * *